No. 695,475. Patented Mar. 18, 1902.
J. McFARLANE & D. C. REINOHL.
PROCESS OF HULLING COTTON SEED.
(Application filed Aug. 29, 1901.)
(No Model.)
1
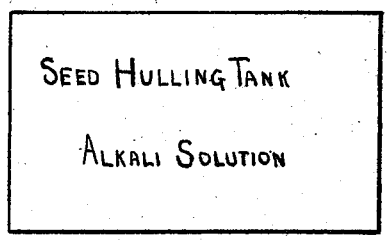
Seed Hulling Tank
Alkali Solution
2
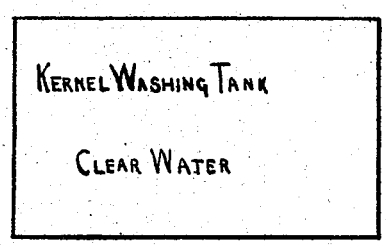
Kernel Washing Tank
Clear Water
3
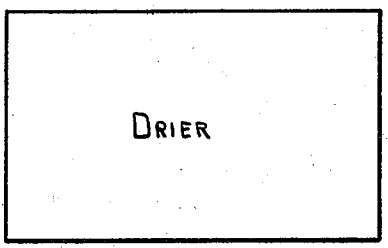
Drier
4
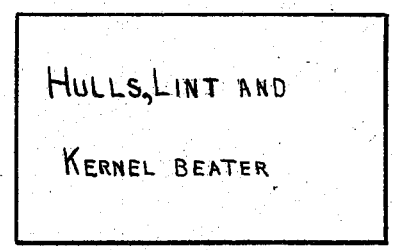
Hulls, Lint and
Kernel Beater

UNITED STATES PATENT OFFICE.

JOHN McFARLANE AND DAVID C. REINOHL, OF WASHINGTON, DISTRICT OF COLUMBIA.

PROCESS OF HULLING COTTON-SEED.

SPECIFICATION forming part of Letters Patent No. 695,475, dated March 18, 1902.

Application filed August 29, 1901. Serial No. 73,676. (No specimens.)

*To all whom it may concern:*

Be it known that we, JOHN McFARLANE and DAVID C. REINOHL, citizens of the United States, residing at Washington, in the District of Columbia, have invented certain new and useful Improvements in Processes of Hulling Cotton-Seed; and we do hereby declare the following to be a full, clear, and exact description of the invention, such as will enable others skilled in the art to which it appertains to make and use the same.

Our invention relates to the art of hulling cotton-seed, has for its object a rapid and perfect removal of the hulls from cotton-seed without injury to the kernel for producing oil or injury to the hulls or the lint for subsequent use in the arts in which they are commonly used, such as the manufacture of paper and other articles, and consists in certain steps of treatment, which will be fully disclosed in the following specification and claims.

Cotton-seed as they come from the gins incased in their hulls and lint or delinted seed are immersed in a solution of potash, caustic soda, or concentrated lye of commerce properly diluted with water and saccharine matter in which some fermentation has taken place and corrosive agents have been developed or in which corrosive agents have been developed by the action of foreign agents, such saccharine matter being preferably black molasses, known to the trade as "black-strap," or other heavy molasses, or brown sugar, the solution being contained in a suitable receptacle, such as a tank or vat. The solution is used at a temperature above normal, or from 100° to 150° Fahrenheit, and of a strength ranging from about 2° to about 5° Baumé and the seed retained in the solution from twenty to thirty minutes or longer, according to the age of the seed, completely immersed, when the hulls open, and the kernels released therefrom and denuded of all their covering except the pericarp rise and float upon the surface of the liquid, when they are collected in a suitable receptacle and removed for further treatment. In treating seed several years old, and consequently very hard and dry, the temperature of the solution may be increased and the strength of the solution also increased, as neither the increased temperature nor the increased strength of the solution affects the kernels deleteriously when they are used for making oil, but rather proves an advantage thereto, in that the kernels are softened and they absorb a larger percentage of the alkali, which is carried with them and remains in the oil extracted therefrom and is subsequently utilized in refining the oil. In preparing the solution alkali is supplied until the acidometer indicates about 2° Baumé, when saccharine matter is added thereto until the strength of the solution reaches about 4° Baumé. This is intended for seed of a last crop or a year or two old; but, as heretofore stated, when old seed—say from three to four years old—are to be treated the strength of the solution and the temperature may be increased to expedite the opening of the hulls, and thereby prevent "water-logging" of the kernels, in which condition they will not float on the surface of the solution.

In practice we have discovered that when seed are treated in bulk or large quantity or when seed several years old are treated agitation of the seed lying in the vat is necessary to allow the kernels to disengage or free themselves from the hulls and lint and rise to the surface of the liquid. We have also discovered that a small percentage of the kernels become entangled in the hulls and the lint, and to recover these the refuse of the vat, comprising the hulls, lint, and the entangled kernels, are removed from the vat, partially dried, and then thoroughly agitated or beaten, which causes the kernels to disengage and separate from the hulls and the lint, when they are readily collected for use. In the treatment of this refuse to recover the kernels we have found that when the refuse becomes too highly heated or dried there is a tendency of the hulls, to which one end of some of the kernels is still adhering, closing upon the kernels and preventing their disengagement therefrom. This beating of the refuse also loosens the lint and the hulls and gives to this product a fluffy appearance, which adds greatly to its commercial value. The kernels may now be taken direct to a press or other means and the oil extracted from the kernels, or they may be washed in fresh or salt water and subsequently dried for shipping, or they may be taken direct from the alkaline bath and dried, and the hulls and the lint may be baled and subsequently converted into paper-stock or used for other purposes in the arts.

It is obvious that delinted seed may be treated in like manner and is within the scope of our invention.

The product of our invention—cotton-seed kernels denuded of their lint and hulls, incased in their pericarp only, and dried—is claimed in the sole application of John McFarlane, Serial No. 74,134.

For the purpose of illustration the accompanying drawing represents a diagrammatic plan view of means adapted for carrying out our invention, and in which—

1 indicates a tank or vat in which seed may be treated for separating the kernels from the hulls; 2, a like receptacle in which the kernels may be washed; 3, a drier, and 4 means for beating or agitating the hulls and the lint to recover entangled kernels.

Having thus fully described our invention, what we claim is—

1. The process of hulling cotton-seed, which consists in subjecting seed incased in their hulls to a solution of alkali and saccharine matter in which corrosive agents have been developed until the hulls open and the kernels separate therefrom.

2. The process of hulling cotton-seed, which consists in subjecting seed incased in their hulls to a solution of alkali and black molasses, until the hulls open and the kernels separate therefrom.

3. The process of hulling cotton-seed, which consists in subjecting seed incased in their hulls and lint to a solution of alkali and saccharine matter until the hulls open and the kernels separate therefrom, collecting the free kernels from the surface of the liquid, then removing the hulls, lint, and entangled kernels and agitating the same to recover the kernels.

In testimony whereof we affix our signatures in presence of two witnesses.

JOHN McFARLANE.
DAVID C. REINOHL.

Witnesses:
D. WEIMER REINOHL,
S. A. TERRY.